US012430717B2

(12) United States Patent
Groeneveld

(10) Patent No.: US 12,430,717 B2
(45) Date of Patent: Sep. 30, 2025

(54) MODEL GENERATION AND APPLICATION FOR REMOVING ATMOSPHERIC EFFECTS IN IMAGERY

(71) Applicant: Advanced Remote Sensing, Inc., Hartford, SD (US)

(72) Inventor: David Groeneveld, Hartford, SD (US)

(73) Assignee: Advanced Remote Sensing, Inc., Hartford, SD (US)

( * ) Notice: Subject to any disclaimer, the term of this patent is extended or adjusted under 35 U.S.C. 154(b) by 502 days.

(21) Appl. No.: 17/585,163

(22) Filed: Jan. 26, 2022

(65) Prior Publication Data

US 2023/0237622 A1    Jul. 27, 2023

(51) Int. Cl.
*G06T 5/70* (2024.01)
*G06T 7/90* (2017.01)
*G06V 20/10* (2022.01)
*G06V 20/13* (2022.01)
*G06V 20/17* (2022.01)

(52) U.S. Cl.
CPC .................. *G06T 5/70* (2024.01); *G06T 7/90* (2017.01); *G06V 20/13* (2022.01); *G06V 20/17* (2022.01); *G06V 20/188* (2022.01); *G06V 20/194* (2022.01); *G06T 2207/10032* (2013.01); *G06T 2207/20081* (2013.01); *G06T 2207/30168* (2013.01); *G06T 2207/30188* (2013.01)

(58) Field of Classification Search
None
See application file for complete search history.

(56) References Cited

PUBLICATIONS

Fourty, Thierry, and FrÃ© dÃ© ric Baret. "Vegetation water and dry matter contents estimated from top-of-the-atmosphere reflectance data: A simulation study." Remote Sensing of Environment 61.1 (1997): 34-45. (Year: 1997).*
Mahakud, Sasmita, and Pradipta Roy. "Gray Scale Image Restoration Using Advanced Atmospheric Light Estimation." 2019 Fifth International Conference on Image Information Processing (ICIIP). IEEE, 2019. (Year: 2019).*
Groeneveld, David, et al. "A New Method for SmallSat Atmospheric CorrectionaDescription and Validation." Aug. 12, 2021, 35th Annual Small Satellite Conference. (Year: 2021).*
Groeneveld, David, et al. "A New Method for SmallSat Atmospheric Correction—Description and Validation." Aug. 12, 2021, 35th Annual Small Satellite Conference. (Year: 2021).*
Katkovsky, Leonid V., et al. "Fast atmospheric correction method for hyperspectral data." Remote Sensing 10.11 (2018): 1698. (Year: 2018).*
De Los Reyes, Raquel, et al. "PACO: Python-based atmospheric correction." Sensors 20.5 (2020): 1428. (Year: 2020).*

* cited by examiner

*Primary Examiner* — Matthew C Bella
*Assistant Examiner* — Johnny B Duong
(74) *Attorney, Agent, or Firm* — Scale LLP

(57) ABSTRACT

Systems and methods for generating and using statistical models to mitigate atmospheric effects in images are described. In some embodiments, a statistical model may be generated by selecting a vegetation type that grows in continuous healthy canopies; identifying a vegetation reference value that is a stable reflectance property of the vegetation type; in a plurality of images, selecting one or more plots of the vegetation type and obtaining top-of-atmosphere reflectance for the plots; selecting discrete areas near the plots and obtaining top-of-atmosphere reflectance for the discrete areas; obtaining image statistics for the discrete areas; and generating a statistical model based on the acquired data.

16 Claims, 17 Drawing Sheets

MODEL GENERATION AND APPLICATION FOR REMOVING ATMOSPHERIC EFFECTS IN IMAGERY

FIELD OF THE INVENTION

This method relates generally to the field of photonics in converting Earth observation satellite images of top-of-atmosphere reflectance to surface reflectance.

BACKGROUND

Images obtained by Earth observation satellites (EOS) are of growing importance for monitoring and management across vast scales with applications including crop cover and health that affect food security, and defense reconnaissance to maintain national security, and many others. While EOS provide tools to monitor across vast regions of the Earth's surface when orbiting above the atmosphere, EOS look through variable content of aerosols and gases that impact the utility of the imagery. The resulting atmospheric effects change the radiance, the amount of light recorded, and the reflectance calculated from it. Reflectance (e.g., radiance normalized by the sunlight received at the top of the atmosphere (TOA)) is of interest for many EOS image applications. The combined effect of varying levels of aerosols and gases degrades the reflectance signal and the useful information that can be obtained from it.

SUMMARY

The following description presents a simplified summary in order to provide a basic understanding of some aspects described herein. This summary is not an extensive overview of the claimed subject matter. It is intended to neither identify key or critical elements of the claimed subject matter nor delineate the scope thereof.

In some embodiments, a method for generating a statistical model to generate a spatial representation of the atmospheric effects across an observation device image may be provided. The method may include selecting a vegetation type that grows in continuous healthy canopies; identifying a vegetation reference value that is a stable reflectance property of the vegetation type to serve as a reference against which the atmospheric effects can be estimated; and identifying the vegetation type growing in continuous healthy canopies on a plurality of observation device images that expresses a range of atmospheric conditions. The method may further include, for each of the plurality of images, selecting one or more plots of the vegetation type, each such plot expressing living homogeneous vegetation cover; measuring a top-of-atmosphere vegetation reflectance value for the selected vegetation plot(s); selecting one or more discrete areas, each of the discrete areas being within a 20 kilometer distance of the selected vegetation plot(s); obtaining a top-of atmosphere reflectance for one or more spectral bands of the observation device from the one or more discrete areas; determining, for each discrete area, a plurality of statistics based on the top-of-atmosphere reflectance of the one or more spectral bands; and pairing the statistics for the one or more discrete areas with the vegetation reference value of the vegetation, thereby forming a sample pair for the respective image. The method may further include combining the sample pairs from the plurality of images into a pooled sample, and, from the pooled sample, generating a model that predicts the top-of-atmosphere vegetation reference values based on the spectral band statistics sampled from the discrete areas.

In some embodiments, a model generated as described above may be used in a method for mitigating atmospheric effects in an image generated by an observation device. In some embodiments, the method may include, for an at least one top-of-atmosphere image of the observation device, sampling one or more statistics across the image; using a model to calculate a spatial representation of the atmospheric effects, the atmospheric effects resulting in degradation of image data relative to what would be recorded at Earth's surface; and using the spatial representation of the atmospheric effects to remove the atmospheric effects from top-of-atmosphere observation device image.

In some embodiments, a system for generating a statistical model to generate a spatial representation of the atmospheric effects across an observation device image may be provided. The system comprising may include a processor and a computer-readable medium storing instructions that, when executed by the processor, are configured to cause the system to perform any of the methods described above.

Further variations encompassed within the systems and methods are described in the detailed description of the invention below.

BRIEF DESCRIPTION OF THE DRAWINGS

The accompanying drawings, which are incorporated in and form a part of the specifications, serve to promote an understanding for conversion of top-of-atmosphere images to surface reflectance images. In the drawings.

DETAILED DESCRIPTION OF THE EMBODIMENTS OF THE INVENTION

Figure 1:
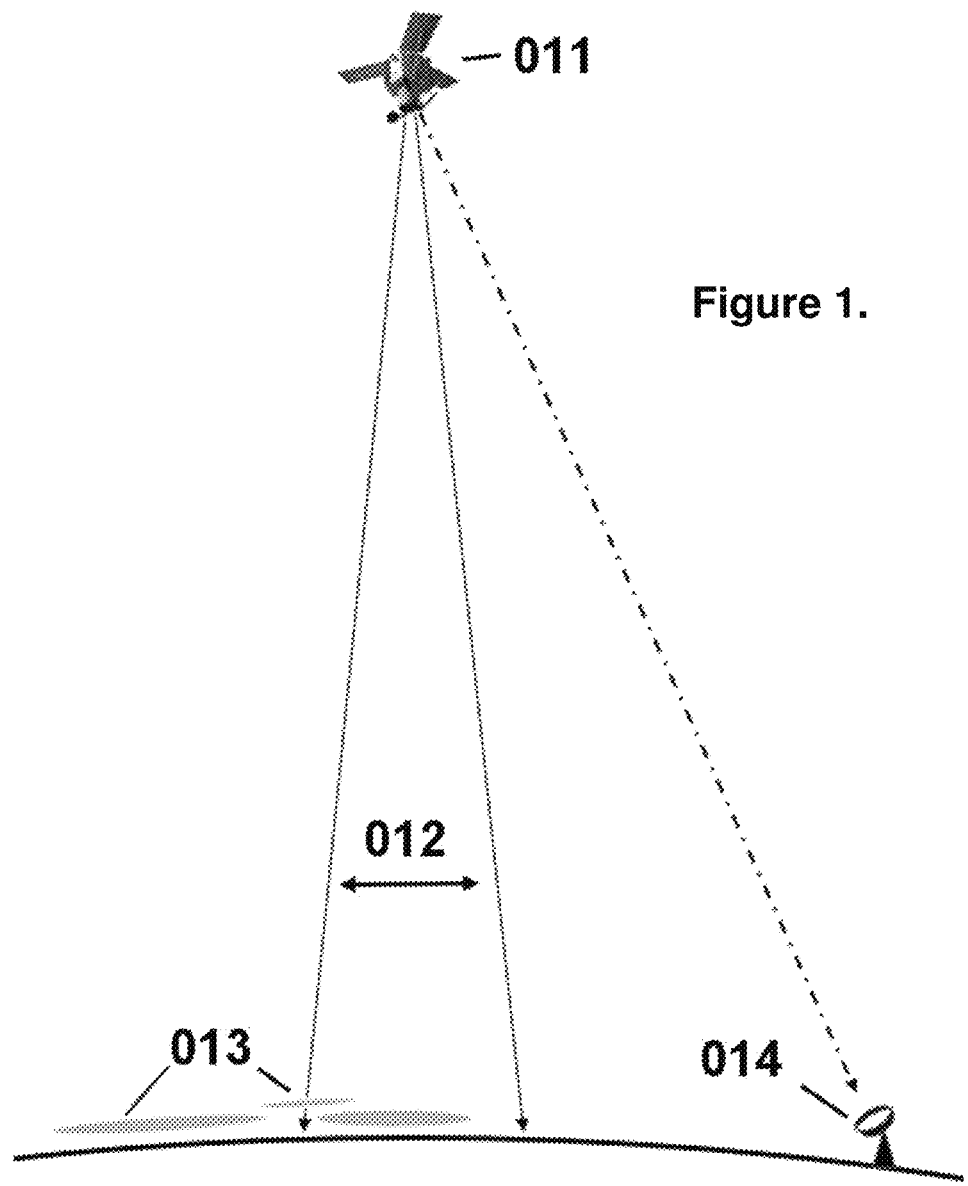
FIG. 1 illustrates an imaging EOS recording data and transmitting it to a ground station.

The effects of aerosols and gases can be treated as a lumped parameter. For example, the lumped parameter can be considered an atmospheric effect (AE) parameter, which can cause degradation in EOS images. As a lumped parameter, AE represents the changes to surface reflectance, what would be measured on the ground, to TOA reflectance (TOAR), what the EOS records. The term "image" can include, for example, visible properties portrayed in GIS software of an EOS tile as provided by the image vendor, a screenshot of the tile or a subset area, and data of one or more spectral bands.

For application to vegetation or crop performance, digital EOS image data may be combined mathematically in various ways depending upon the analysis desired. Without correction, such analyses may be impacted by AE due to changes in the reflectance data recorded. Conversion of the data to surface reflectance may remove AE influences from the imagery and can facilitate both for automated computer data analyses and for viewing of images. Atmospheric correction may remove haze, a visual indicator of strong AE changes in the reflectance data. Surface reflectance (SR) may refer to measurements obtained as if measured were there no atmosphere, and may be equivalent to groundtruth.

Methods for estimating SR may begin with calibration of a vegetation yardstick, which may provide a stable surface reflectance used as a standard against which the AE can be measured. A next step may calibrate an EOS for the application of the method. Once calibration steps are completed, operational correction can begin. In some embodiments, operational correction may be automated, routine, repeated conversion of TOAR data to SR.

EOS images may include rasters of millions of spatially discrete pixels. Each pixel can contain data from multiple spectral bands and each band may have a discrete wavelength range of the spectrum—for example, the most common EOS configuration can have four bands described in part by the colors they represent in the visible spectrum: blue, green, red, and just beyond visible light, near infrared (NIR). Embodiments of the systems and methods described herein may be applied to any imaging EOS band. All EOS bands recording reflected light are affected by passage of light through the atmosphere.

Embodiments described herein may use observations of archived images for selection of particular images and sampling areas on them for calibration purposes. This operation can employ a geographic information system (GIS) for visualization, for selection of samples and for performing steps in the assembly of the software for the present art.

Calculations that convert TOAR to SR may be performed by computer. In some embodiments, one or more computers may convert TOAR images to SR images. For example, the one or more computers may map the effects that are mathematically structured changes induced by atmospheric transmission then reverse the TOA effects to deliver SR.

1. Conceptual Model to Convert TOAR to Surface Reflectance

In some embodiments, calibration may first be performed to prepare the procedures and data for application of the conversion for a new EOS. In other embodiments, the relative spectral responses (RSRs) may be equivalent to an already calibrated EOS, and calibration may optionally be omitted. After calibration of the EOS, the conversion may deliver SR for that EOS from then on. Recalibration may be used in the event of sensor drift.

FIG. 1 illustrates how imagery is acquired by an EOS 011 that records the amount of reflected light (e.g., radiance) from within a field of view 012 that is affected by an atmosphere that contains airmasses with variable AE 013. The recorded radiance data are transmitted to a ground station 014 that distributes the raw radiance data to the company fielding the EOS. The entity operating the EOS processes the data to ensure accurate geographic location, and data expressed as radiance that may be converted into reflectance through normalization by the TOA solar irradiance.

The present method can begin after the image is downloaded, or alternatively, the software can reside within the EOS, wherein it can perform the conversion onboard and then transmit the corrected SR image directly to the ground station. The techniques disclosed herein are particularly suited for onboard conversion due to the efficiency of the processing techniques.

In particular, the conversion can be made to operate in near real-time once compiled and optimized, and for small areas of interest of about 100 square kilometers may require only a few seconds for the conversion.

In some embodiments, TOAR may be converted to SR. Normalizing radiance by the TOA solar irradiance removes variability in the data due to daily and/or seasonally varying levels of solar radiation. Consequently, reflectance may be advantageous for use in remote sensing applications that use EOS image data.

Figure 2:
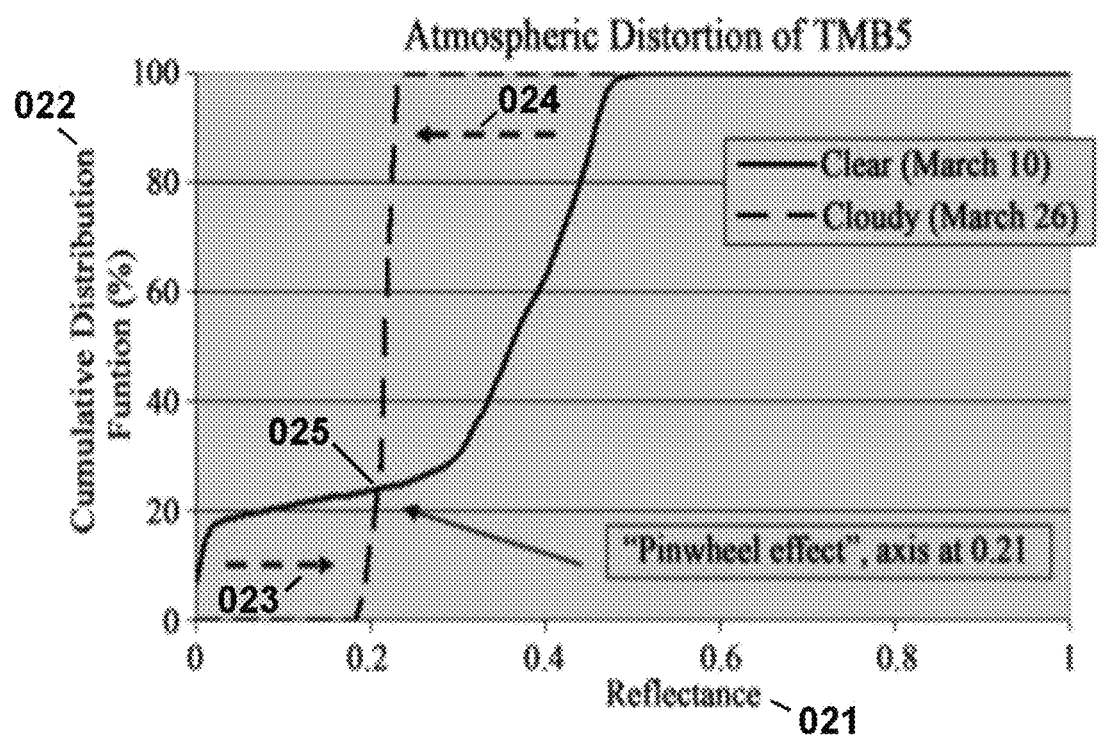
FIG. 2 illustrates the Pinwheel Effect described by Groeneveld and Barz (2013)

The conversion may map and reverse AE using a conceptual model based on a natural phenomenon observed by Groeneveld and Barz (2013, Open Journal of Modern Hydrology 3:241-252) dubbed the "Pinwheel Effect", as illustrated in FIG. 2. An observable change in TOAR levels 021 can be seen between the cumulative distribution 022 acquired on the "clear" day (low AE) compared to the data acquired on a day with patchy thing clouds (high AE). On the day with thin clouds the reflectance levels of darker objects increased due to backscatter 023, while the reflectance levels of brighter objects decreased due to attenuation 024. There is a reflectance level, dubbed the Axis point, where the two effects self-cancelled for the band that was studied 025. Thus, the Pinwheel Effect causes such curves to spin counterclockwise for increasing AE and clockwise for decreasing AE, resulting in constantly changing reflectance levels for all EOS bands for all pixels across the image.

Figure 3:
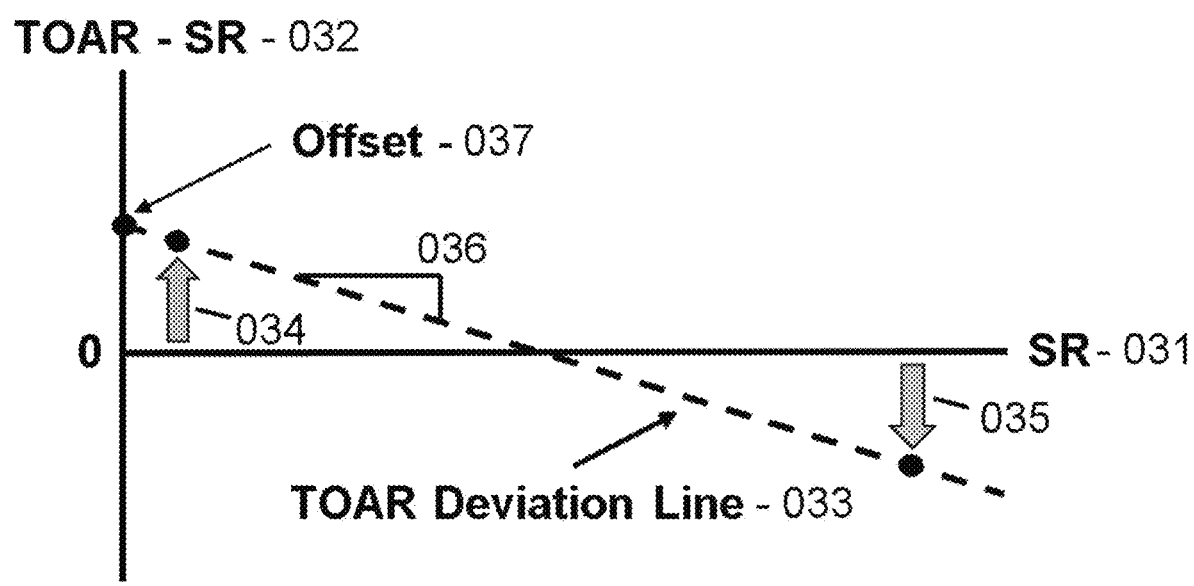
FIG. 3 illustrates a conceptual model for conversion.

FIG. 3 presents a conceptual model that was derived through study of the Pinwheel Effect which can be used to convert TOAR to SR. In some embodiments, each band of the EOS sensors may be converted. These bands may respond in the same general manner but to a different degree. Such changes are influenced by the position of the EOS band within the spectrum: shorter wavelengths may be more affected by aerosols while at longer wavelengths, reflectance may be more affected by gases, particularly water vapor. These effects may be lumped together as AE.

The x-axis of FIG. 3 is SR 031, and the y-axis is the TOAR recorded by the EOS modified from SR by transmission through the atmosphere, defined as the difference, SR from TOAR: TOAR-SR 032. Measured points from dark and bright targets are shown that establish a TOAR Deviation Line 033. Due to AE, darker reflectance is enhanced through backscatter (gray arrow up; 034) and brighter reflectance values are decreased due to attenuation (gray arrow down; 035). The degree of these effects is variable across the reflectance distribution and represented as the TOAR Deviation Line. The TOAR Deviation Line for any AE magnitude has a slope 036 and an offset (y-intercept) 037 that are used as the parameters for reversal of the AE to estimate SR. The TOAR Deviation Line can vary according to the AE. Both slope and offset increase in magnitude for increasing AE, and decrease for lower AE.

The conceptual model may be incorporated in a conversion to address pixels across an image of any TOAR magnitude, dark to light. The conceptual model of FIG. 3 can be used to correct images when expressed mathematically by Equation 1. The TOAR Deviation Line represents a range of SR values for one level of AE as modified through the Pinwheel Effect of FIG. 2. The slope (m) and the offset (b) are the parameters in Equation 1 that Convert each pixel across the image from TOAR to SR described below.

$$SR=(TOAR-b)/(1+m) \qquad \text{Equation 1}$$

In some embodiments, all calculations used in converting the image from TOAR to SR may be performed using image statistics obtained or derived from an EOS image (e.g., radiance or reflectance data). In some embodiments, only data obtained or derived from the EOS image may be used without ancillary data. These closed-form mathematics are efficient and rapid, taking only a small fraction of the calculation runtime of prior art methods that use radiance values, ancillary data, and iteration to find solutions. Through the pinwheel effect, it is apparent that AE expression causing the change from SR to TOAR is highly structured. The Conceptual Model and Equation 1 captures this structure to permit conversion to deliver estimates of SR from TOAR. The simplicity of these calculations permits this relationship to operate in near real-time for application in remote surveillance of targets by EOS or through high-altitude drones or manned aircraft.

2. Vegetation Yardstick, MinB, to Assess Atmospheric Effects (AE)

In some embodiments, the reference capacity of vegetation may be used for converting TOAR to SR. Vegetation may be used as a reference when calibrating and identifying SR using three EOS bands. These bands can be used to identify locations in the TOAR image where appropriate vegetation can be used for reference. The use of "yardstick" in this context is a shorthand reference that recognizes a specific property of vegetation used as a standard against which to estimate AE. Because of differences in the RSR for the blue band of each EOS, this quantity can be established for each EOS quantified by field data. The continuous traces of spectrometer data may be be transformed into the bands of each EOS for application to the conversion. In some embodiments, the measurement data may be banded into the spectral bands by integrating the product of the sensor RSR and the hyperspectral reflectance within each band. This quantity may then be divided by the integrated sensor RSR response for that band.

Figure 4:
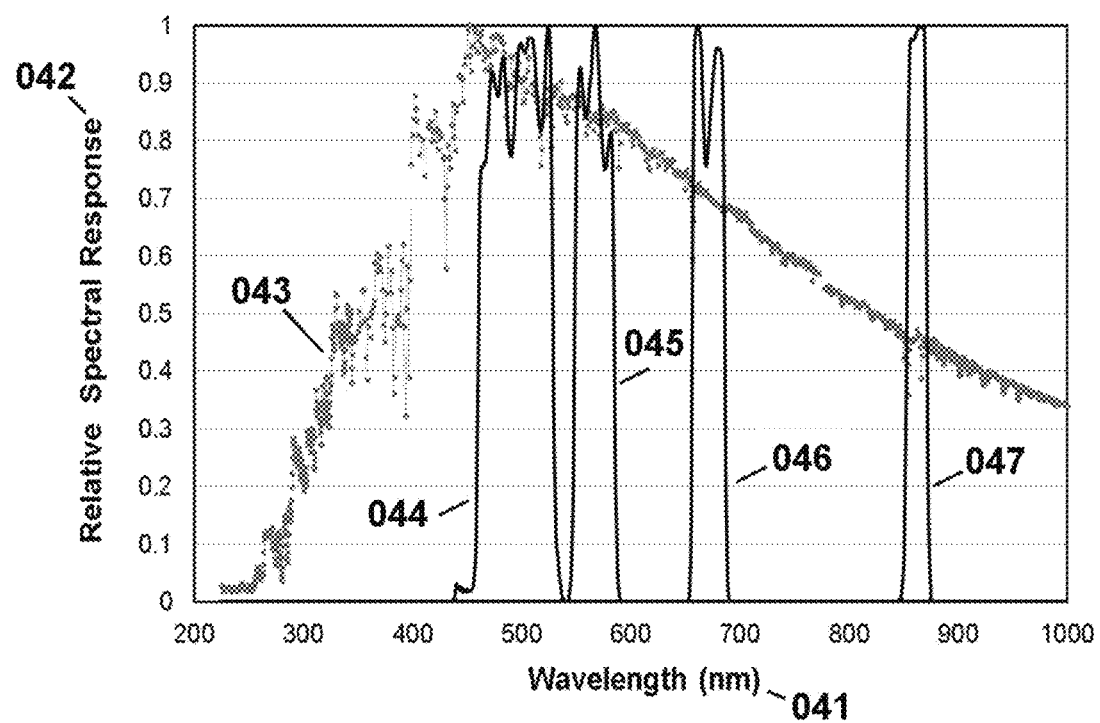
FIG. 4 is a graphic representation of a TOA solar radiance curve and relative spectral responses of the Sentinel 2 EOS.

FIG. 4 illustrates the RSRs for the four bands of the Sentinel 2 EOS. The independent variable is wavelength 041 with RSRs 042 that have been normalized to one by the highest radiance response within the band. As an example, the RSRs for Sentinel 2 bands are plotted according to the wavelength 041 for blue 044, green 045, red 046 and NIR 047. Once the spectrometer data have been banded by RSR responses of the EOS, they are representative of the SR for that EOS.

Figure 5:
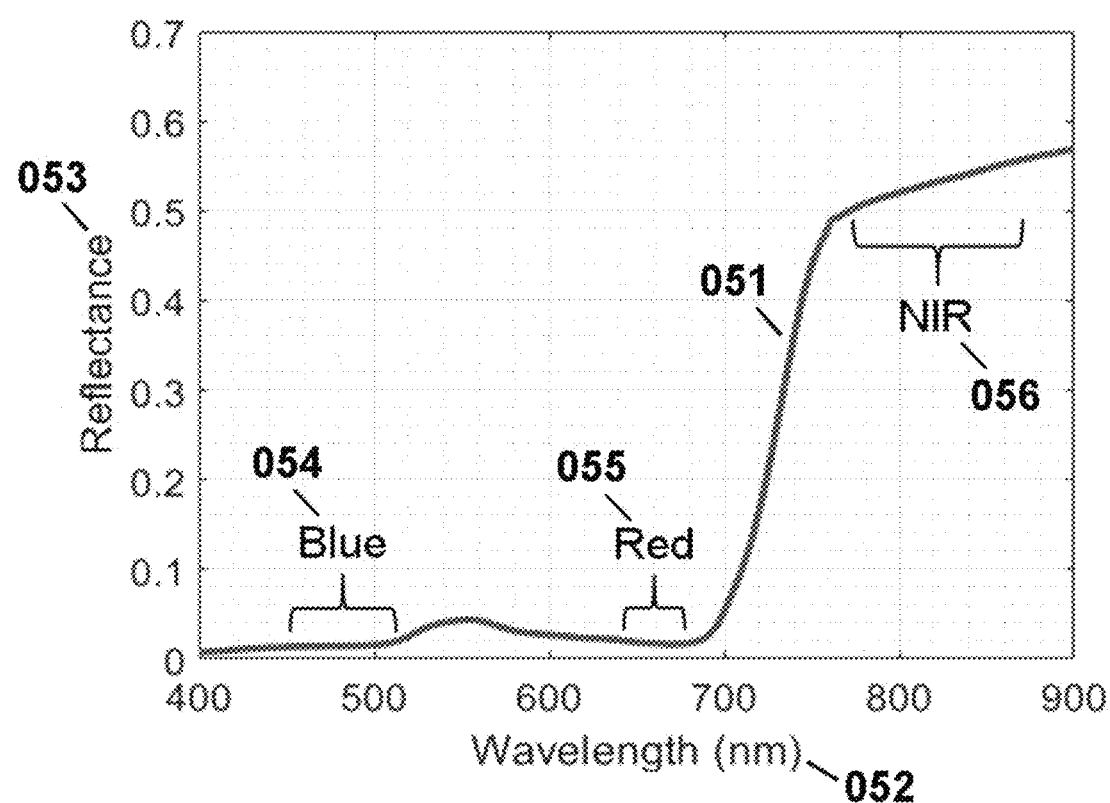
FIG. 5 is a spectrum collected by spectrometer over continuous healthy cover (CHC) of lawn grass.
Figure 6:
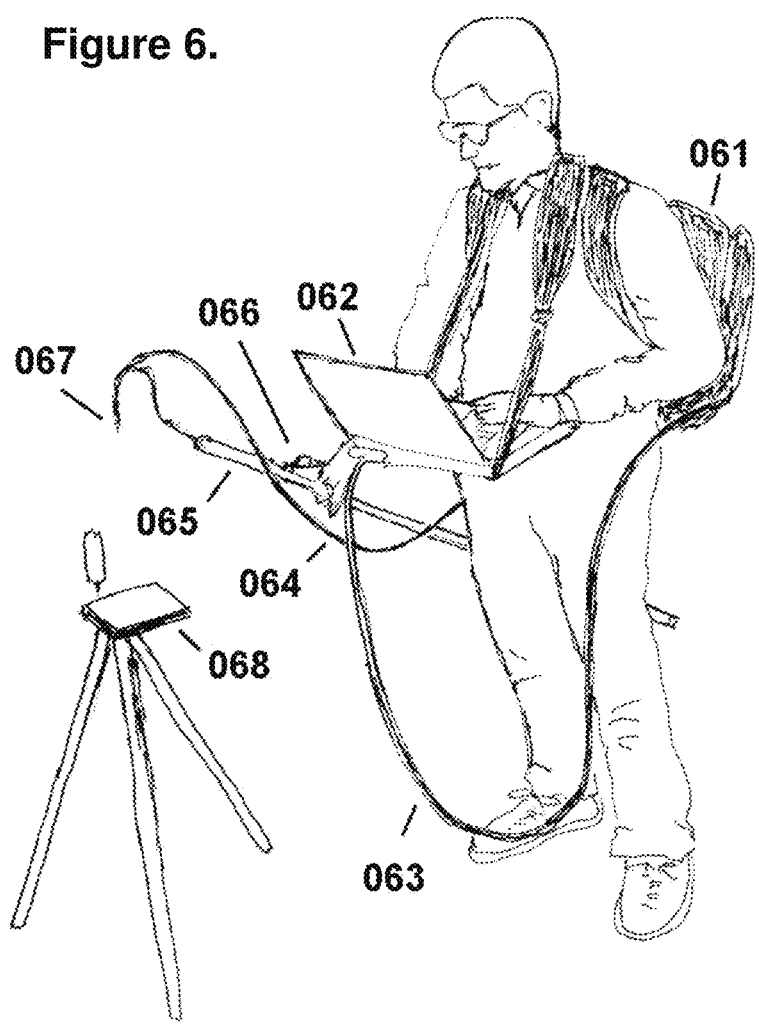
FIG. 6 is a drawing of field spectrometry equipment for measuring and recording surface reflectance.

FIG. 5 shows a representative CHC vegetation SR spectrum of lawn grass acquired by field spectrometer measurements that were gathered with equipment shown in FIG. 6. The spectrum of FIG. 5 is a continuous trace 051 across wavelength 052 of SR 053 extending through the visible, from blue through red light. The ranges for the three bands of Sentinel 2 used in the conversion, blue 054, red 055 and NIR 056, are shown. The low reflectance of CHC vegetation such as that visible in the blue band 054 of FIG. 5 may be used as an AE yardstick. The CHC vegetation yardstick of low, stable reflectance can be established by measuring spectra over CHC vegetation.

Vegetation targets on EOS images are particularly advantageous for quantification of AE due to a shared physiological property of all plants that grow with open exposure to the sky. Plants develop their energy through photosynthesis using the solar energy to drive the process. Because plants must photosynthesize on cloudy days or when partially shaded by other plants, they absorb nearly all photosynthetically active light; the majority of that energy coming from the blue wavelengths. Photosynthesis saturates at about one quarter of the energy of midday full sun leaving the excess of the absorbed highly energetic blue light to potentially damage the plant's photosynthetic capacity. Carotenoid pigments are used by plants to absorb the excess solar radiation and then dissipate it as heat. The highest level of solar energy occurs in the region of the blue band, as shown in the TOA solar radiance curve 043 of FIG. 4. This is the spectral region where carotenoid pigments absorb the maximum amount of light. Consequently, the level of reflected energy from living plants in this spectral region is significantly reduced in open sky, high light conditions that are recorded by EOS.

Though RSRs may vary somewhat, the blue bands of EOS capture the peak absorbance response due to carotenoid pigments that results in low, but stable reflectance. The relatively stable low blue reflectance across virtually all plants exposed to the open sky enables use of the SR for maximal plant cover/vigor expressed in continuous healthy canopies (CHC) as the reference yardstick against which to measure AE. This minimal blue reflectance from CHC vegetation, abbreviated SR MinB, was chosen as the SR reference value against which magnitude of AE can be estimated. Operating in this capacity, TOAR MinB can be calibrated to be a surrogate for AE as a first step toward operational assessment of AE during image Conversion. Furthermore, confining yardstick calibration to a specific vegetation type enhances the precision of the AE estimate.

Figure 7:
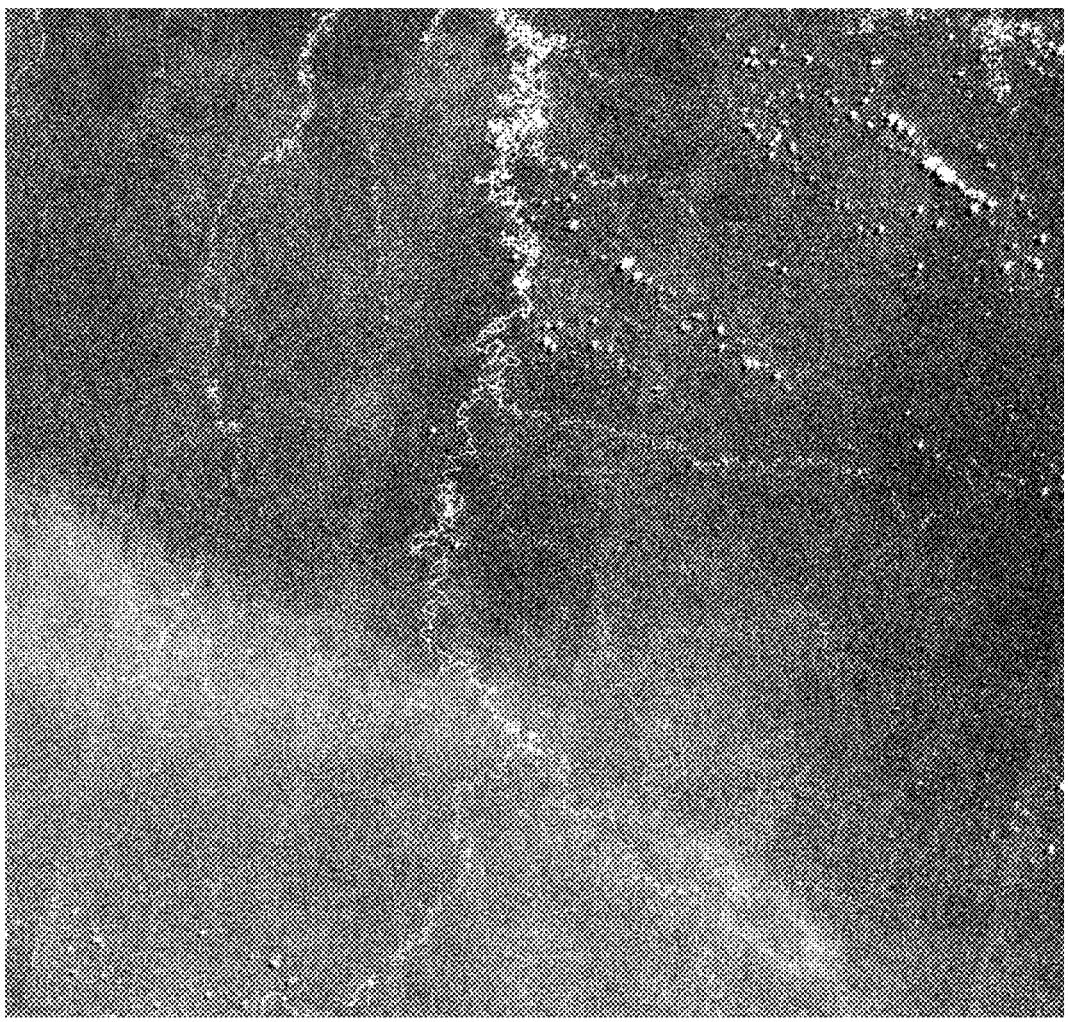
FIG. 7 is a grayscale image of a red-green-blue color portrayal of TOAR for a Sentinel 2 tile over the Amazon Basin illustrating a pattern of haze.
Figure 8:
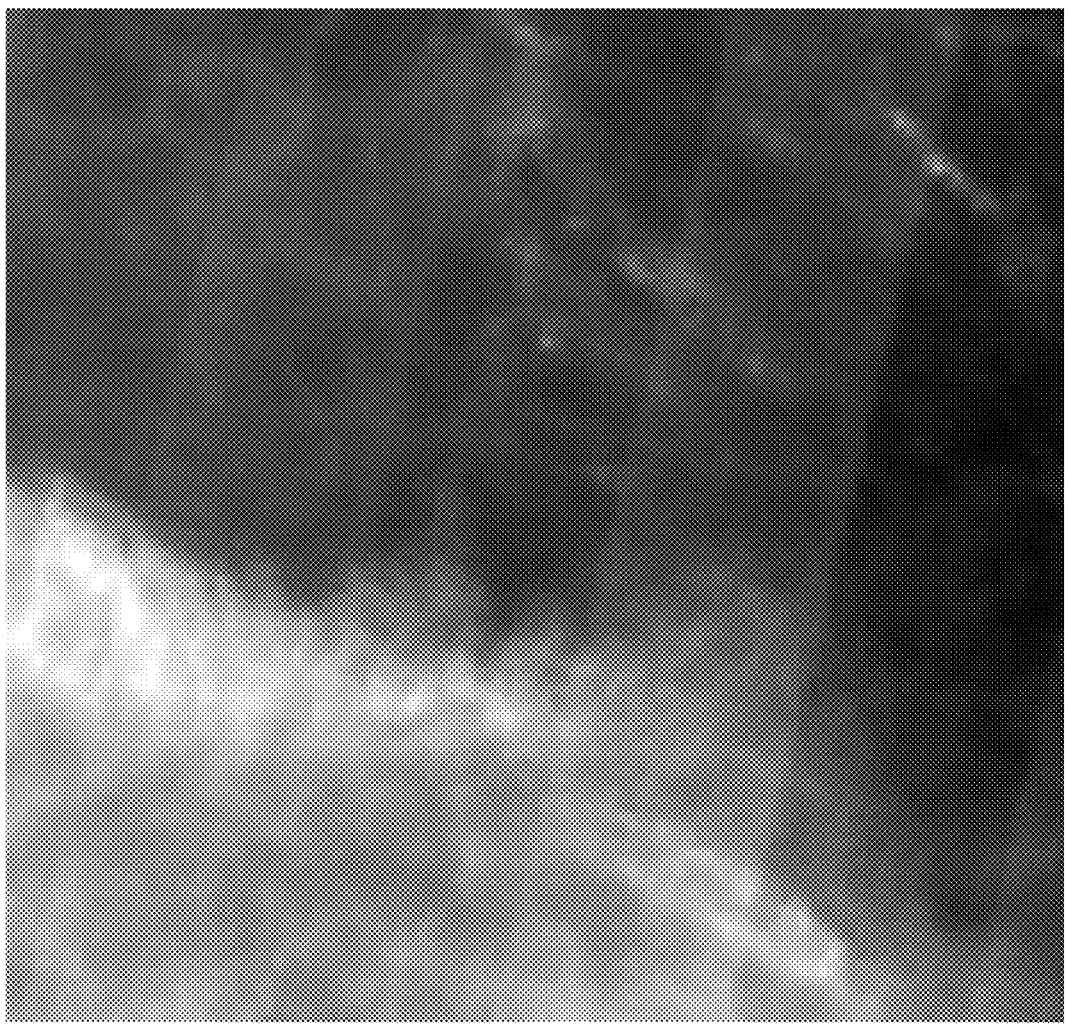
FIG. 8 is an image of a MinB-based grayscale developed from low blue reflectance of vegetation to map AE in a pattern that conforms to the haze visible in FIG. 7.
Figure 9:
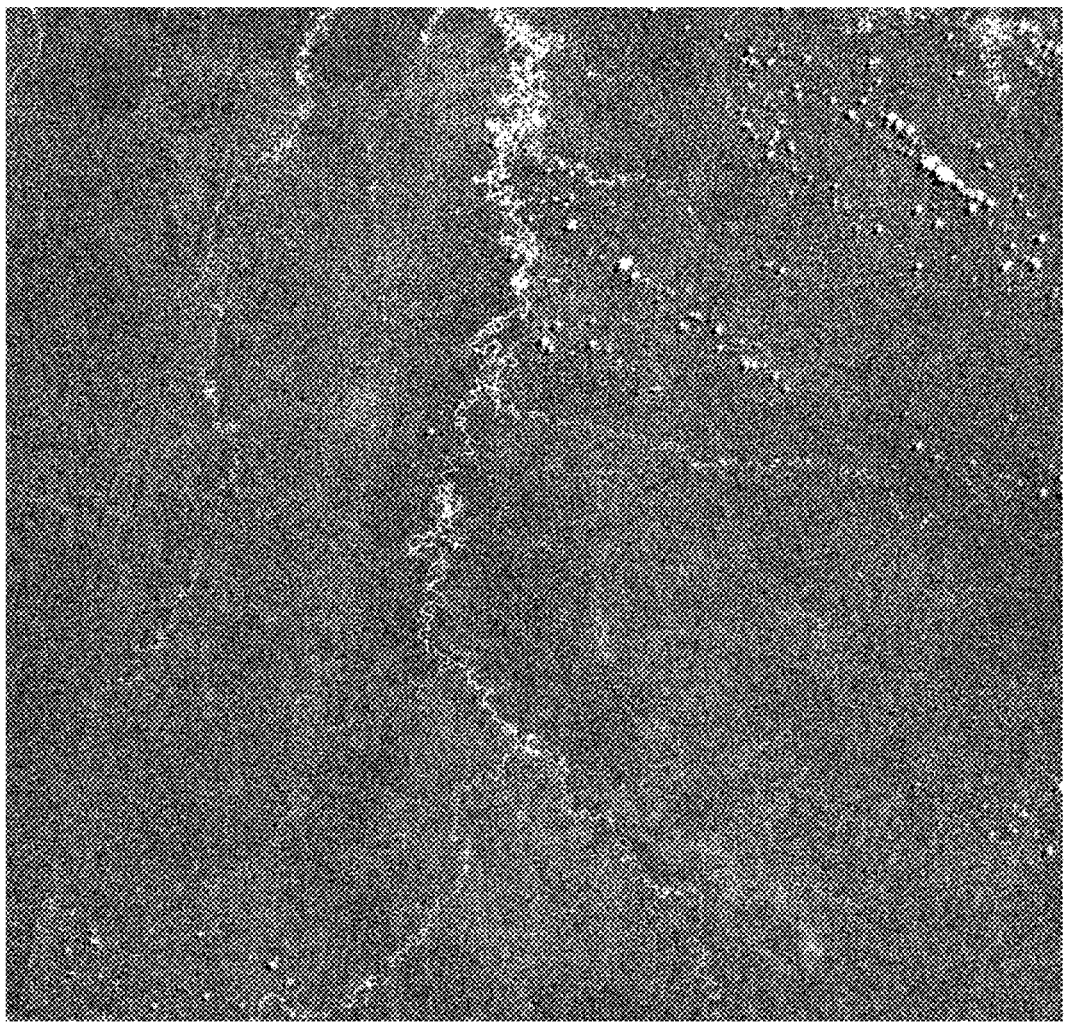
FIG. 9 is a grayscale image of a red-green-blue color portrayal of the FIG. 7 TOAR image converted to SR with input of the MinB grayscale shown in FIG. 8.

The use of MinB as a yardstick against which AE can be assessed across images as spatially-discrete estimates of AE was tested on images as a lump-sum parameter; lump sum because the individual contributing effects from aerosols and gases are not differentiated. Like all indices, MinB is unitless. Gridcell sample statistics to assess MinB as a surrogate for AE provide spatially discrete estimates across the image to be corrected. FIGS. 7 through 9 are products that confirm the process for estimation of the AE using MinB as input to correct the image. The area shown is slightly larger than 100 km×100 km and is a full Sentinel 2 image tile of part of the Amazon Basin. FIG. 7 is a TOAR grayscale representation of a true color GIS screenshot that shows haze across the lower third of the image. A map of AE was developed using MinB identified on the image that resulted in the grayscale shown in FIG. 8; a screenshot of the grayscale GIS display. The MinB grayscale map results from grid sampling across TOAR images and as shown in FIG. 8, closely mimics the pattern of haze visible in the TOAR image of FIG. 7. Such MinB maps provide a vector scale that expresses how aggressive the correction must be to reverse spectral changes due to AE: the brighter the grayscale, the more aggressive the correction. FIG. 9 is a grayscale portrayal of the color image GIS display visually confirming that the MinB-based Conversion removed the visible haze from AE. Additional analyses have demonstrated the mathematical validity of SR Conversion using MinB grayscales.

3. Translation of MinB into a Statistically-Based Model, Atm-I, to Map AE Across Images.

While the actual CHC vegetation can be used to evaluate AE across an image, reliance upon finding such vegetation across an image presents a limitation. This occurs during leafless wintertime periods in high latitudes, for tundra, over bodies of water, or for arid regions that would restrict the present methods usage only to warm weather conducive to plant growth in humid climates or in agricultural areas dominated by plots of CHC vegetation. Fortunately, AE causes different but predictable changes to each of the bands highlighted in FIG. 5: blue, red, and NIR. Hence, MinB, the known, stable, low blue reflectance of CHC vegetation, can be used to train a statistically-based model to assess the MinB AE yardstick not from vegetation per se, but from the responses of these three bands. By using samples that represent the range of conditions that can be encountered, the model may be made to be robust across the full range of AE conditions. This may be achieved by sampling across a range of vegetation cover from discrete areas nearby the CHC samples.

Sampling for an atmospheric model can be performed using a grid to sample a statistical distribution of the collection of pixels within grid cells to extract the statistics for modeling, for example minimum, median and maximal values of the three bands for the model. GIS software can be employed for image observation and selection of samples to accomplish the choosing and sampling the CHC vegetation.

For a statistical model to operate over the entire range of AE conditions that may be encountered requires sampling to calibrate across the range of AE varying from exceedingly clear to so profound that the ground view is nearly obscured by haze. Higher levels of AE can be assessed where effects of smoke from wildfires are present. For this sampling, AE may preferably be homogeneous over area representing the cover conditions in locations adjacent to where MinB from CHC vegetation is estimated. With practice, such homogeneity can be accurately judged by observation of the image on GIS software displays. For calculating the model, the blue, red, and NIR reflectance values may be extracted for each of the discrete areas surrounding the CHC vegetation where adjacent AE-representative values of MinB were sampled. A grid system to define spatially-defined sampled areas for statistical sampling of the three bands can be deployed through use of GIS software to simplify data extraction for processing in the model.

The suite of sampled locations can be pooled for regression modeling to predict MinB, the independent variable, from the paired, extracted values for dependent variables, blue, red and NIR band statistics. Multiple regression techniques can then be used to calculate the model. For convention, the term MinB can be restricted to actual values extracted from CHC vegetation. The value predicted for MinB from the statistical model can be referred to here as the "atmospheric index" in recognition that these are modeled values. The atmospheric index is abbreviated "Atm-I".

The accuracy of the Atm-I model can be enhanced by choosing a single crop type as the basis for estimating MinB as a surrogate for AE; for example, alfalfa, soybeans, corn, etc. grown in many diverse locations. A single crop type provides a target of very similar reflectance response to support the best accuracy to assess a statistical model of AE based upon the measured TOAR spectral band responses. Discrete areas adjacent to plots of the chosen CHC crop can be selected for a range of cover at an equivalent AE that is confirmable through direct observation of haze. If present, the haze may preferably be uniform in selected samples. GIS software display can be employed for visual confirmation, or after calibrating the AE model, applying it to calculate AE and then observing the homogeneity of the results. The resulting Atm-I model is the basis for assessing the AE used as the input for Conversion of the image from TOAR to SR.

Figure 10:
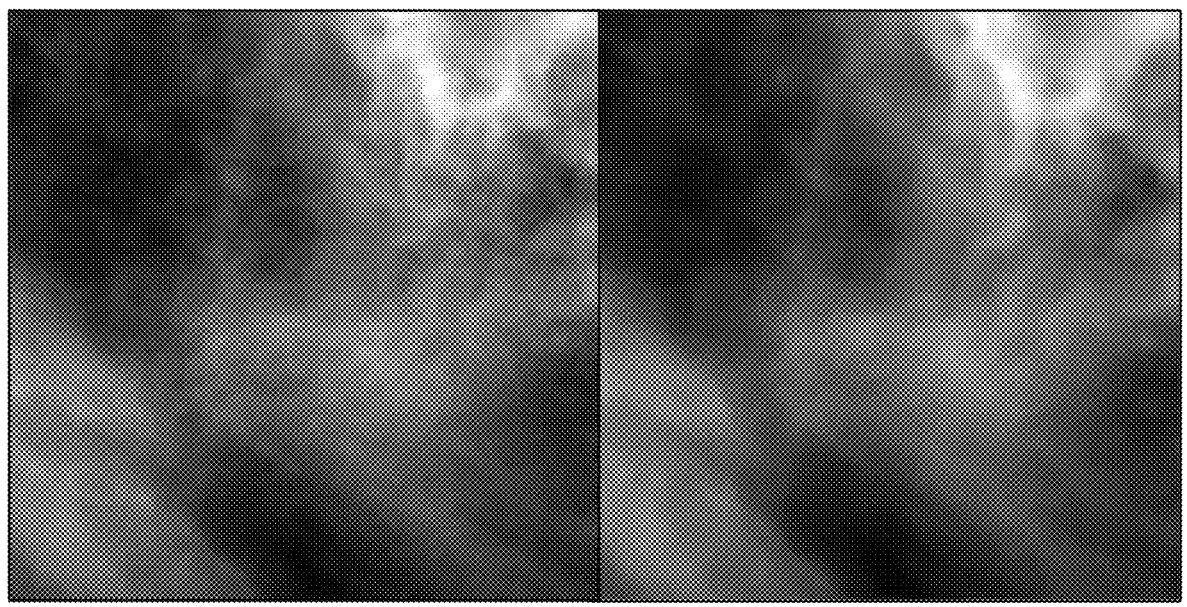
FIG. 10 presents two screenshots of AE grayscales generated from MinB (left) and Atm-I (right)

The resulting multiple regression model has coefficients that can be multiplied by the bandwise statistics provides set atmospheric effects over the gridcell as Atm-I. Image Conversion can employ the Atm-I grayscale for input rather than a MinB-based grayscale. This was tested using MinB-based grayscales against Atm-I based grayscales (FIG. 10) that confirm the results are comparable. The equivalency of these two grayscale representations of AE was also confirmed mathematically.

When applied to convert an image from TOAR to SR, Atm-I may optionally be translated into the slope and offset of Equation 1 to reverse the measured TOAR to deliver SR. Calibrating slope and offset responses for an EOS across the range of Atm-I is described next in Section 4.

4. Calibrating the EOS for Image Conversion

Using Equation 1 and the conceptual model of FIG. 3, only two parameters are needed to provide pixelwise Conversion of TOAR to SR: the slope and offset of the TOAR Deviation Line. These parameters can be determined through calibration for each new EOS. Calibration can be rapid and precise using an engineered calibration target, or slower and more painstaking through image to image comparisons confirmed through spectrometer-gathered groundtruth. A third method is possible, intercalibration with a correctly converted image from the same or another EOS with the same spectral band RSRs. However, serial calibration of images could lead to compounding systematic error, so intercalibration may provide less accurate results over time. As described below, calibrating an EOS to convert images from TOAR to SR may be performed using a calibration target.

Figure 11:
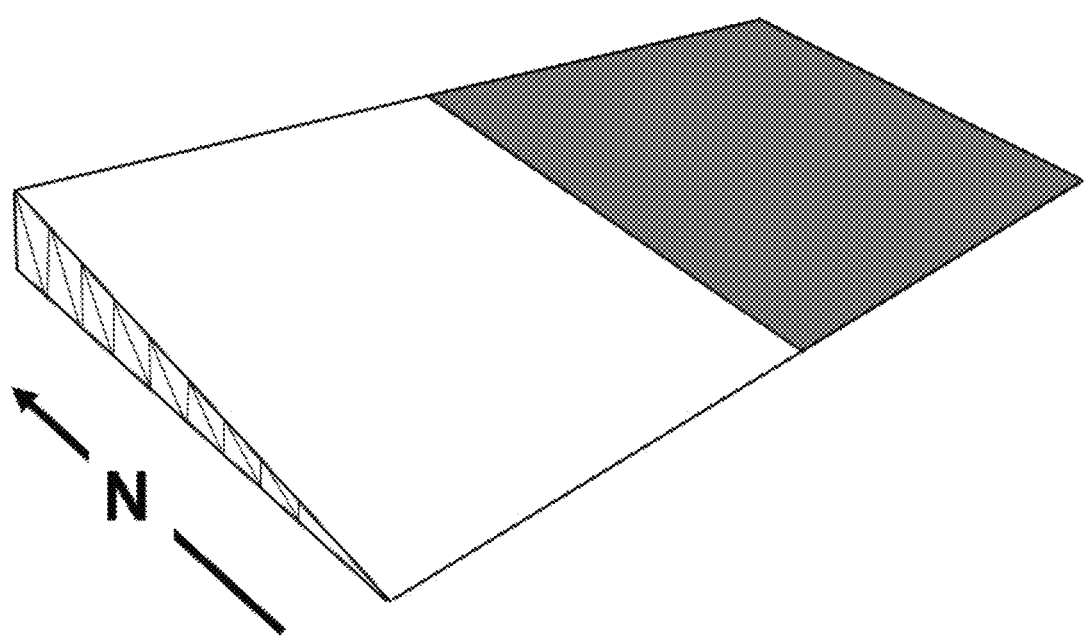
FIG. 11 is a generic drawing of a calibration target that has dark and bright panels large enough to acquire a statistical sample of pixels of each spectral band.

Calibrating an EOS may be a three-step process. The first step in calibrating the EOS can be accomplished by determining the groundtruth reflectance using field spectrometry (FIG. 6) of a calibration target (FIG. 11) that has dark and bright panels of sufficient size to capture multiple pure pixels of TOAR for images of the EOS undergoing calibration. Pure in this context means the lack of spectral mixing of the target with other cover surrounding the calibration target panels. Pure TOAR pixels on the calibration target can be determined if there are multiple pixels across the target: in each spectral band, pure pixels will have minimal variability of reflectance values compared to mixed pixels. For calibration, mixed pixel data must be discarded. The pure pixels for each overpass are averaged for comparison to the average SR of the target panels measured by spectrometer.

All EOS bands to be Converted can be calibrated. The spectrometer data, gathered during a several-hour period around midday under clear skies over the calibration target, are the groundtruth SR to represent the dark and light panels. The spectrometer data are banded for the RSRs of the EOS to arrive at the band-wise SR translated for each spectral band of the EOS. The dark- and bright-panel SR data are paired with the dark- and bright-panel TOAR data from each overpass; each image to yield SR from groundtruth and TOAR from the image. These paired values are used as the inputs that define the TOAR Deviation Line shown in FIG. 3. Each overpass defines a unique TOAR Deviation Line and its corresponding slope and offset values. A TOAR MinB value may then be determined for each overpass. Returning to the discussion of the vegetation yardstick in Section 2, SR MinB for the target CHC vegetation may be measured using field spectrometry, yielding a single average SR MinB that serves as the vegetation yardstick for the EOS. SR MinB for every overpass has a corresponding y value that lies on the TOAR Deviation Line calculated as the quantity (TOAR MinB-SR MinB). Equation 1 may be fitted using the quantity TOAR-SR. In some embodiments, TOAR MinB without SR subtracted may be calibrated into the Atm-I model. In these embodiments, the values obtained from the calibration target may preferably be be decoded by adding SR to yield a surrogate TOAR MinB as measured in TOAR images as Atm-I.

TOAR MinB determined from inversion of the conceptual model may be used as an independent variable of the Master Curves for each band that predict slope and offset as the dependent variables. Master Curves may be a translation of any TOAR MinB value into slope and offset for input to Equation 1. The slope and offset to drive the conversion appropriate for the degree of affect from AE may be represented by TOAR MinB measured on the calibration target and calculated by inversion of the conceptual model. The corresponding calibrated y-values of slope and offset for each overpass establish the Conversion to SR from any TOA MinB input. This correction may be valid for the MinB magnitude of that overpass. Multiple calibration overpasses may extend the conversion to a range of TOAR MinB magnitudes. The values of slope can be pooled together across the magnitude of MinB inputs, and a function can be fitted from this pooled data to form a slope Master Curve. Similarly, offset values derived in this process can be pooled and fitted to form an offset Master Curve.

Figure 12:
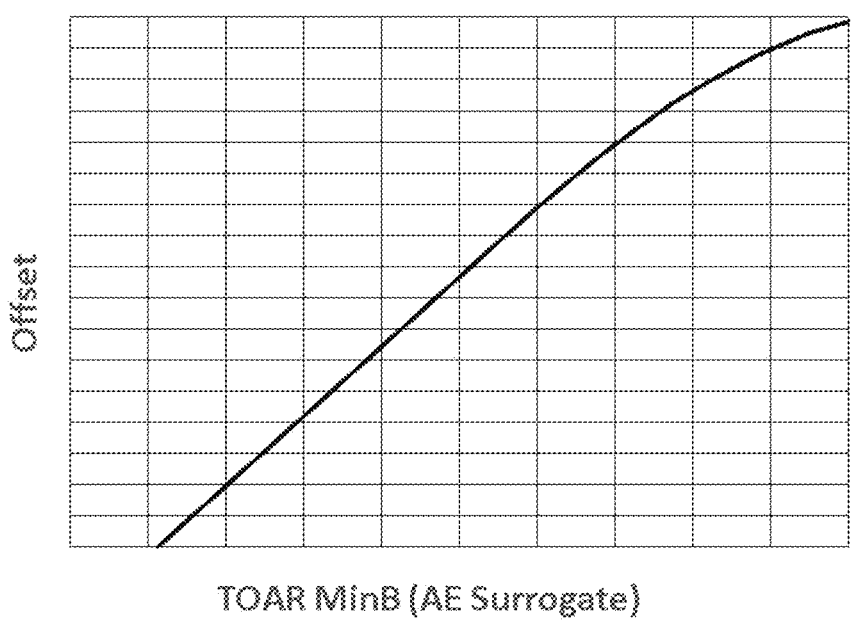
FIG. 12 is a graphic representation of an offset Master Curve for the blue band of the Sentinel 2 EOS.

The Master Curves of slope and offset to estimate these two parameters for the entire range of correctable AE can be expressed as MinB and illustrated in FIG. 12 for the offset curve of the Sentinel 2 blue band. Master Curves start with two overpasses and expand to greater ranges for correction as the MinB from subsequent overpasses capture lower or higher AE conditions. In some embodiments, Master Curves may be extrapolated based on data collected from sample image to fill gaps or to extend beyond a sample range. As shown in FIG. 12, Master Curves are complex and non-linear due to atmospheric feedback, so extrapolation may best be used only close to known data points. Full calibration may involve many overpasses under varying degrees of AE from the paired target data as described above.

5. Detailed Workflow to Establish and Apply the Method

Figure 13:
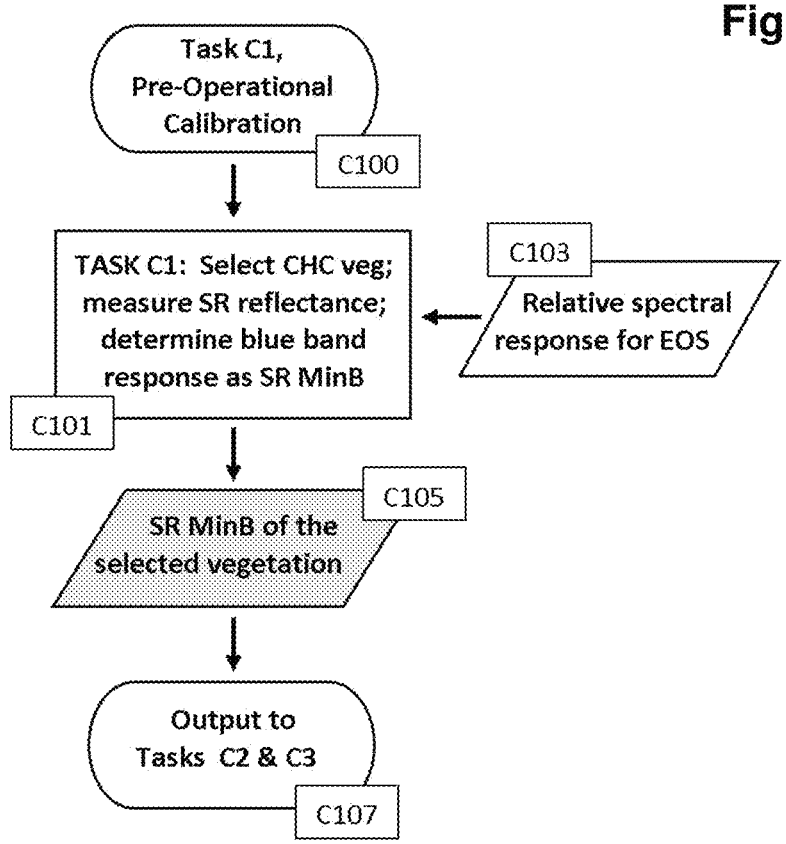
FIG. 13 is a flow chart describing the steps in a pre-operational calibration workflow to develop SR MinB.
Figure 14:
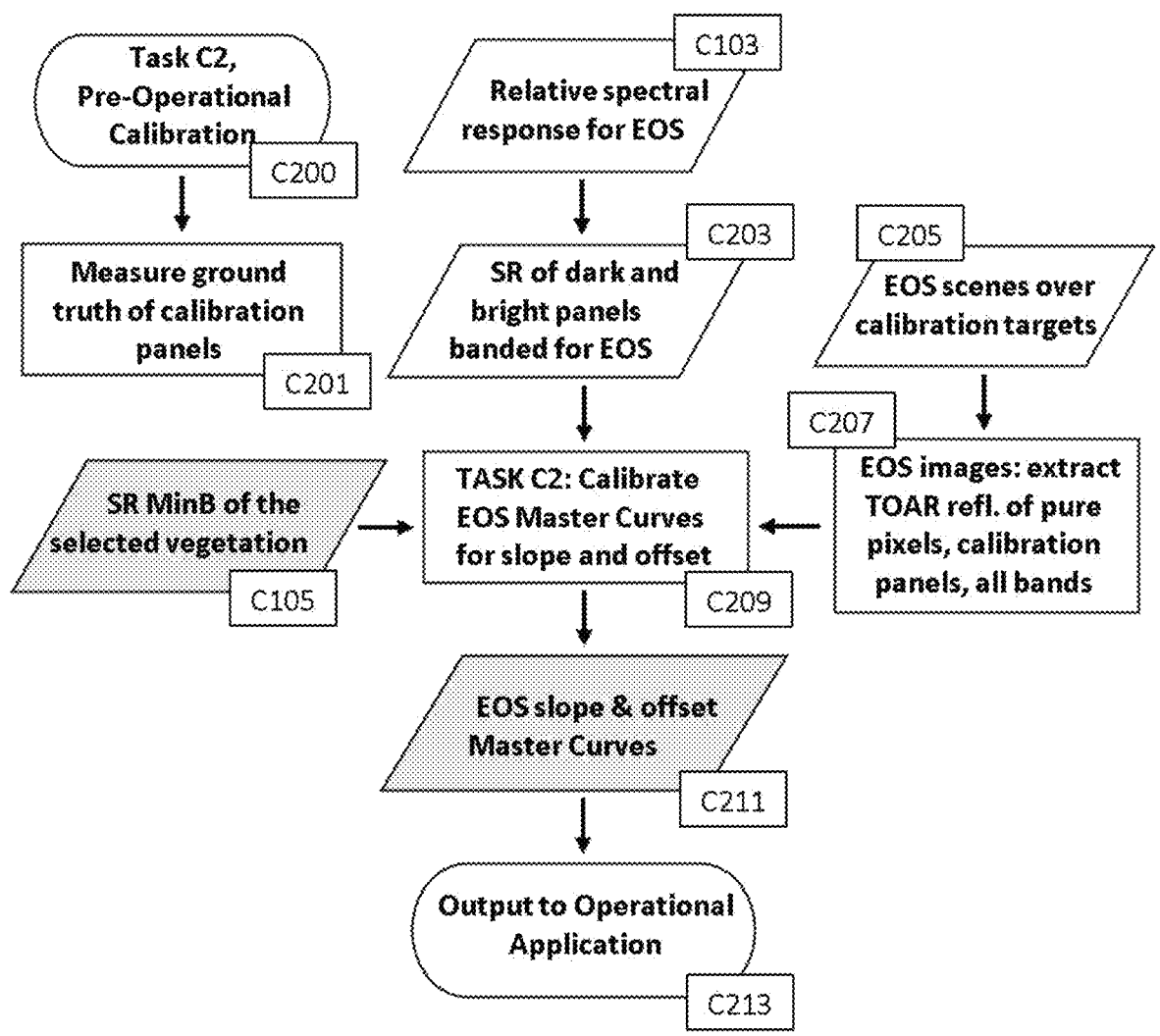
FIG. 14 is a flow chart describing the steps in the pre-operational calibration workflow resulting in Master Curves.
Figure 15:
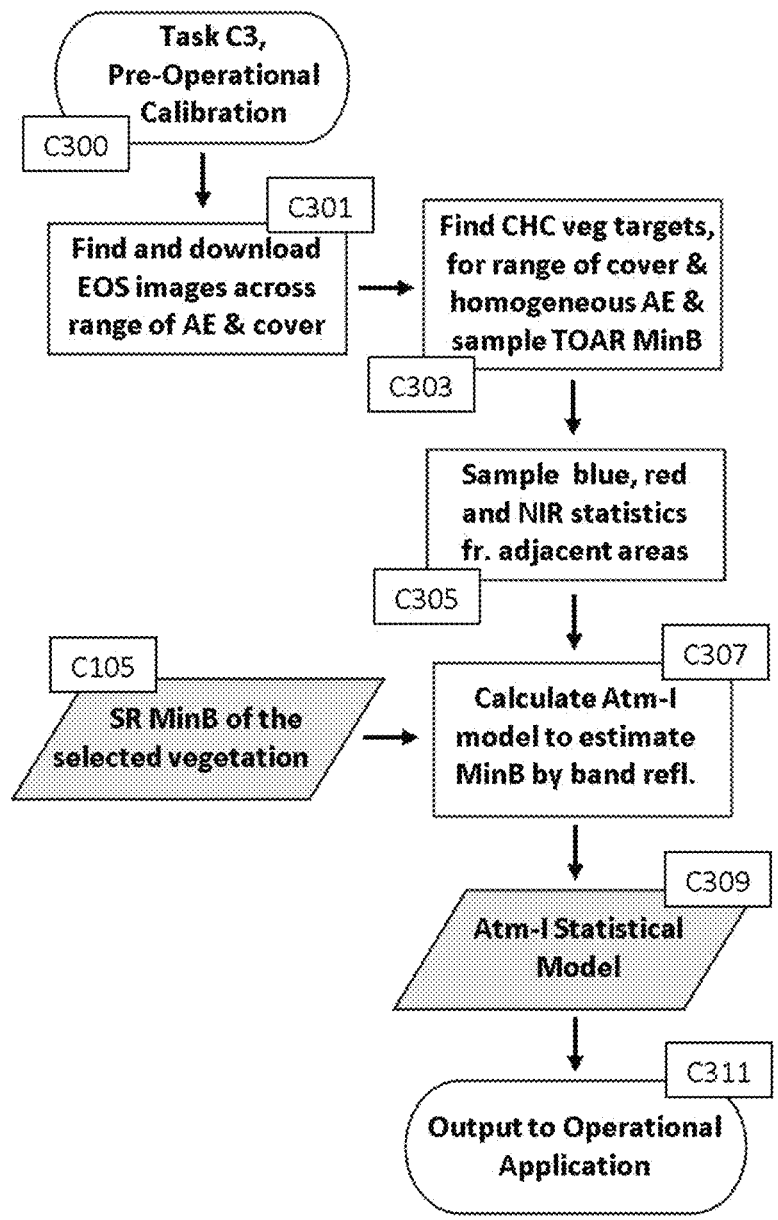
FIG. 15 is a flowchart in the pre-operational calibration workflow resulting in the atmospheric index statistical model, Atm-I.

After calibration is performed, operational conversion may be performed for routine processing of images. Three tasks may be performed for pre-operational calibration (FIG. 13 through 15). Two tasks may be performed to operationally convert an image from TOAR to SR; both are combined on FIG. 16. Pre-operational tasks perform calibration and are denoted by the alpha numeric C and task number: for example, calibration Task 1 is denoted C1. Operational conversion applies the method and is designated "A" for application in the following workflow.

Calibration of the EOS and the conversion from TOAR to SR may be performed using software operated by a computer. Through the EOS data, geolocation is referenced to the actual position on the Earth's surface. This process may be applied through digital data, including image pixels, and grids for sampling and assessment of AE. Various visualization steps in this workflow can be accomplished using GIS software to display images in correct geographic positioning to select CHC vegetation, select hazy, highly AE-affected images, and sample locations adjacent to CHC vegetation to develop statistical input for the atmospheric index model.

The tasks and steps described for the calibration and application of the conversion can be performed in different order or with other alterations, such as the calibration of some steps using machine learning. All such alterations are incorporated within this disclosure.

Pre-Operational Calibration

The present process can conveniently be divided into calibration to establish the inputs for image conversion, followed by operational conversion that uses these inputs to convert images of the calibrated EOS from then on. In some embodiments, calibration may customize the techniques described herein on an EOS-by-EOS bases to accurately convert images for a new EOS. Once completed, such customized calibration can be used from then on, but subject to in-orbit changes due to sensor drift. If such sensor drift is detected, the EOS can again undergo the calibration steps listed here.

Task C1. Defining a Yardstick for the Calibration. In some embodiments, SR MinB may be used as a parameter that establishes the vegetation yardstick against which AE can be measured (FIG. 13). A specific vegetation type may be chosen that is grown in many locations, for example a cultivated crop grown in both humid climates and also in arid climates under irrigation. Such a crop provides a CHC target, and a known SR MinB estimate of AE against the widest possible range of nearby vegetation cover, from none up to CHC. Locations of CHC vegetation can be searched out in image archives of the EOS to be calibrated to provide the range of AE necessary for establishing the Atm-I statistical model in Task C2. The SR MinB parameter may be determined using spectroscopy. Referencing FIG. 13, exemplary calculation steps occur within C101.

At C101, numerous plots of a CHC vegetation type are chosen that have continuous healthy canopies (CHC) exposed to the open sky. This vegetation cover can be chosen by physical appearance as possessing a healthy, uniform, and continuous green canopy. Cultivated crops, including lawn grass can work well for this operation and can be found in many locations. Because of irrigation, CHC vegetation can be supported in arid climates with very low vegetation cover that can be sampled to assure robustness in the Atm-I model described in C3. Spectrometer measurements of these canopies can be performed on a clear day and sampled within a three-hour period centered on solar noon. The spectrometer foreoptic (067 of FIG. 6) can be raised above the plots to cover a sufficiently wide field of view to capture multiple plants at a time. Raising the foreoptic can avoid spectra with extreme variation from sampling individual leaves or the shadow between leaves rather than the mixed and porous surface of leaves that occur even within continuous canopies.

The spectra gathered in many locations over the CHC vegetation can be averaged. These averages can then be translated into the band-wise reflectance for the EOS undergoing calibration using the RSR published by the company flying and selling the EOS data. The RSR for the blue band is input to the workflow at C103.

The dataset from multiple CHC plots of the chosen vegetation type may be pooled and the median blue SR may be calculated, which may be used as a calibrated value as described below as an SR reference value to estimate the lumped parameter atmospheric effects. This reference value is SR MinB in Box C105 that is output in C107 to support calculations in Tasks C2 and C3. SR MinB is a single value, and its magnitude depends upon the vegetation type selected in C101.

Task C2. Calibrating the EOS Master curve. This calibration can include all bands of the EOS by employing a calibration target and relating spectrometric groundtruth measurements of the target's SR and corresponding TOAR obtained from the image data for multiple overpasses of the EOS. This task may not be needed if the RSRs for the bands of the EOS to be calibrated are identical to the RSRs of a calibrated EOS. However, given sensor drift while in orbit, being simple, robust, accurate and especially the most accurate potential method to determine whether the sensor has drifted, this task may preferably be performed routinely for any new EOS. This operation can also be used for quality assurance and control in routine operations for every clear overpass of the calibration target by the EOS.

Referencing FIG. 14, most calculations remain within C209 that is fed by calculations and data from C103 and C105 of FIG. 13 and from C201, C203, C205 and C207. Task C2 is a complex of calculations and inputs that culminates in production of EOS Master Curves (C211) that are output at C213.

Task C2 calibration starts at C201 with measurement of the SR of dark and bright panels of the calibration target using a spectrometer. For simplicity, these measurements are made as close to the time of the EOS overpass as practical (while avoiding being on the target during the overpass). SR can be interpolated between periodic spectrometer measurements of the target panels taken close to the daily overpass time for sun synchronous EOS. Bi-directional reflectance distribution functions (BRDF) govern solar angle effects that may reduce the amount of light that returns along the nadir path to the orbiting EOS. Measurement contemporality between groundtruth and overpass serves to control these effects. An alternative is to generate a BRDF model to permit calculation of the residual light reflected along the nadir path to the EOS during the overpass. Any of these options can be appropriate as long as they represent the nadir reflectance during overpass.

At C203, the SR measurements of the calibration target panels are banded for the EOS using the EOS RSRs that enter the workflow at C103. The groundtruth values are averaged to produce a single statistically-derived value of reflectance for each band on each of the dark and bright target panels.

At C205, one or more TOAR images of the EOS that will feed data to the calibration are downloaded.

At C207 the dark and bright TOAR for one to many pure pixels of each calibration target panel are extracted for each band. Pure pixel values will not diverge greatly for each band being calibrated. Selecting the pixels and extracting the data can be performed conveniently using GIS software for display and extraction. The pure pixel values are averaged to provide one value of reflectance each for the dark and bright panels.

At C209, the SR (C203) and TOAR (C207) for the dark and bright calibration targets are combined to yield two points that establish the TOAR Deviation Line for the overpass (per FIG. 3 conceptual model) having an x-axis as SR and y-axis representing the quantity TOA-SR. Each such TOAR Deviation Line, one per overpass, establishes corresponding slope and offset values. The TOAR Deviation Line can be evaluated to calculate a TOA MinB as a surrogate measure for the AE that created it by finding the y-value on the TOAR Deviation Line corresponding to the fixed x-axis value of SR MinB output at C105 and adding the SR MinB value to it. The resulting TOAR MinB is the estimator of AE that is the independent variable upon which slope and offset values are modeled as dependent variables. When combined for multiple overpasses the multiple TOAR MinB values form the Master Curves output at C213. Master Curves enter into operational Conversion for translating the atmospheric index grayscale into slopes and offsets for each band that provide the Equation 1 SR solutions for every pixel of every band given its MinB TOAR value as input.

C209 is a hybrid workflow step. When performed multiple times, this step also assembles Master Curves of slope and offset to enable estimation of SR within the calibrated range of AE. After the first overpass, the method can be applied for the EOS for the single AE during the overpass yielding only one point each for slope and offset. This point is representative for AE during the measurement and can be accurately extrapolated for small ranges above and below the AE of the overpass, e.g., to plus/minus 2% of the TOAR MinB reflectance surrogate for AE in each band. Above or below this range, the slopes and offsets can still be used for correcting images as an approximation. Subsequent overpasses occurring across a range of AE will extend the calibrated range over time and permit modeling the responses so that they can be extrapolated more accurately. An example blue band calibration curve for offset generated from a wide range of TOAR MinB is presented as FIG. 12.

Task C3. Calibrating the Atm-I model for the EOS. This task may be used to generate a statistical model to assess the TOAR MinB "vegetation yardstick" for AE across images. The statistical representation may be referred to as an Atmospheric Index, abbreviated Atm-I. An exemplary Task C3 workflow is shown in FIG. 15.

At C301, Task 3 may start by finding and downloading images to represent a range of vegetation cover, from none to CHC vegetation on images that experience a range of AE from clear skies to obscuration from aerosol or water vapor often visible in the image as significant haze. Levels of AE can be conveniently selected using GIS software displays of the images.

At C303, locations of the vegetation of the type that was calibrated in Task C1 may be selected across the downloaded images to represent CHC vegetation from which TOAR values may be sampled and analyzed. This step may involve applying knowledge of vegetation and crop types that are grown in the region of the downloaded imagery. This knowledge is possessed by experienced analysts or can be generated from those knowledgeable about vegetation and cropping in the region of each image. Values (e.g., MinB) can be sampled from the CHC vegetation that has been located on the images to act as the vegetation yardstick for measuring AE. Such values can be selected or determined statistically for a polygon of homogeneous CHC, for example, a cultivated field. Locating these samples on the images can be made with the assistance of GIS software.

At C305, locations adjacent to the sampled CHC target vegetation may be sampled to assess statistics for the bands selected to model the interband differences to predict the AE. Blue, red and NIR work well if the spectral bands available are the common 4-band VNIR sensor package. For convenience, a digital grid can be established across the image to define the statistics to be sampled from the extracted grid cells. Higher levels of AE can be visually confirmed through observation of images on a GIS software display. Such high levels of AE may preferably be uniform over the area of the CHC vegetation selected to represent the AE conditions and for the gridcells chosen for ranges of vegetation cover that are sampled in adjacent locations. The appearance of haze may also preferably be uniform and if so, the AE may be uniform as well. Not all ranges of vegetation cover will be found within a single image nor in a single location of CHC, hence multiple images may preferably be selected and observed to achieve samples across a wide range of AE. As this step is completed, care can be made to assure that a relatively even range of samples has been selected for vegetation cover across a relatively even range of AE conditions in preparation for statistical modeling. GIS software can be used for observation of the images to select CHC vegetation, to confirm the presence of haze and its uniformity and to select adjacent areas to sample a wide range of vegetation cover and haze conditions.

At C307, the assembled data may be analyzed to generate a model configured to assess AE based on image data. In some embodiments, multiple regression modeling may be used to predict AE from median values or other statistics for the bands chosen as variables for the regression, for example, blue, red and NIR bands. Other bands can also be used if they exist for the EOS and add significance to the model. Machine learning methods can also be applied to these steps to generate the statistical model.

At C309, the resulting statistical model is output for use in operational image conversion as the Atm-I Statistical Model. The output consists in coefficient values fitted in C307. In some embodiments, the Atm-I model may generate Atm-I values rather than TOAR MinB, a distinction that differentiates the parameter developed through the Atm-I Statistical model yielding Atm-I, from sampled values of TOAR MinB. The output from the Atm-I model may be a grayscale that expresses the magnitude of the atmospheric effect, which may then be used for the conversion.

If additional bands are available to assist generating the statistical model, they can be tested and used in the same manner as is described here for the blue, red and NIR spectral bands. Such embodiments are included within the scope of this disclosure.

Operational Conversion

With calibration completed, operational conversion can be applied. In some embodiments, operational calibration may be applied to any image recorded by a calibrated EOS. Operational conversion may include two tasks, as described below with reference to FIG. 15.

Task A1. Operational Conversion to surface reflectance of an EOS image may include the input of the Atm-I Statistical Model output at C311 of FIG. 15 to map a grayscale of AE across the image; an example shown on FIG. 10. The EOS Master curves generated in C211 of FIG. 14 translate the grayscale into slope and offset for conversion of each band value to surface reflectance using Equation 1. Operational conversion may include repeated correction for images of the calibrated EOS.

Figure 16:
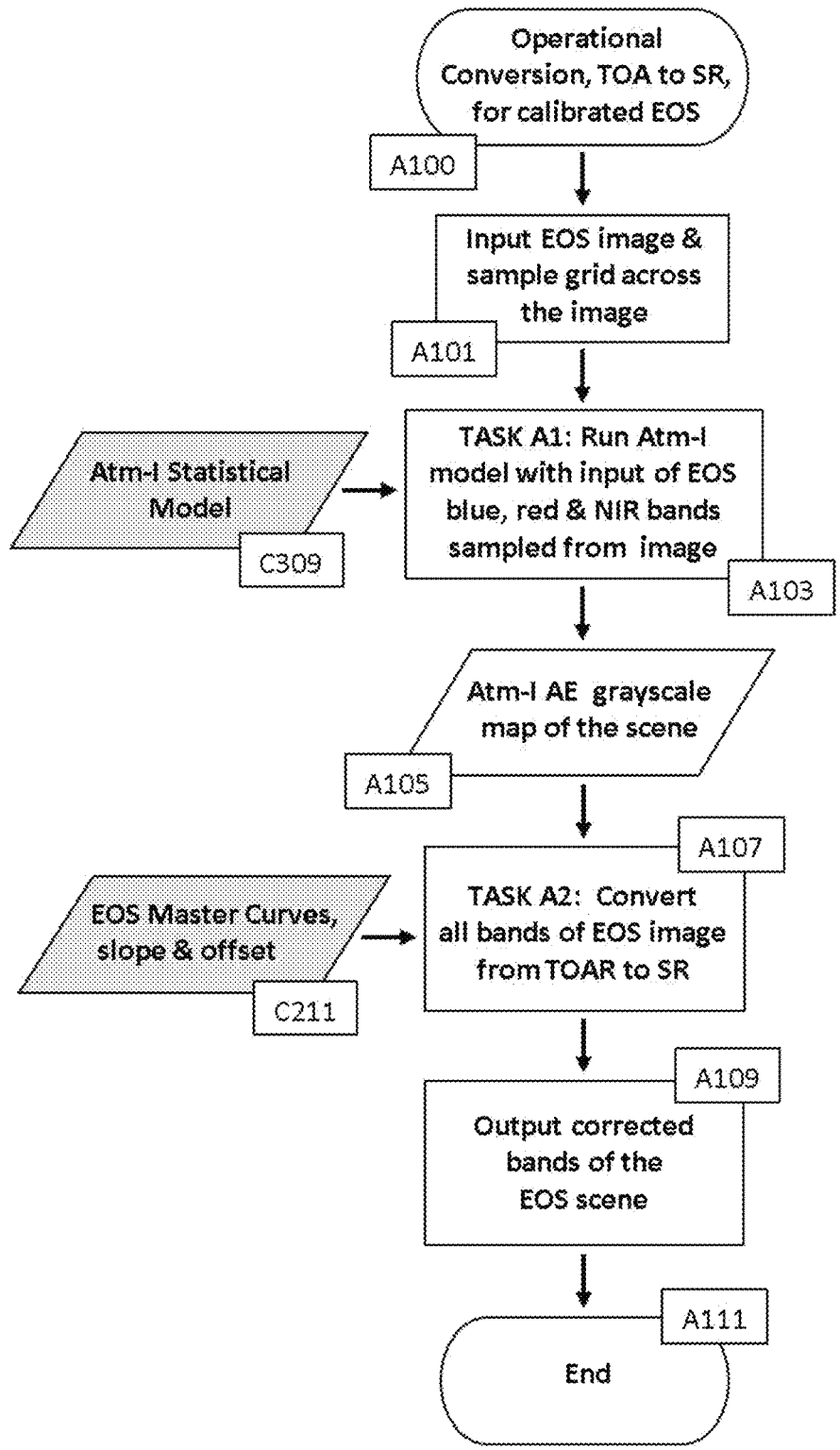
FIG. 16 is a flowchart for the operational Conversion of images from TOAR to SR.

Operational conversion may begin at A101 of FIG. 16 with input of the TOAR EOS image with all spectral bands to be corrected. In some embodiments, a grid may be provided across the image in digital space for spatially defined sampling of AE.

At A103, the Atm-I Statistical Model may be run on the image using inputs of the bands chosen for correction. These inputs are fed in from C311 and consist of multiple regression coefficients for the spectral band variables developed from calibration in Task C3 of FIG. 15.

At A105, the resulting Atm-I grayscale map of the image to be corrected may be output to prepare for the Conversion in Task A2.

At A107, Task A2 converts the TOAR image to SR. For this calculation, the Master Curves for the EOS may be input to translate the A105 grayscale into rasters of slope and offset. The two rasters may then drive the spatially defined Conversion of TOAR to SR values for all pixels and calibrated bands using raster-based application of Equation 1.

At A109, the SR-Converted image is output. This may complete the operational conversion of the image.

The conversion has been described in this disclosure for EOS orbiting above the atmosphere; however, operational conversion is also appropriate for high altitude aircraft such as drones and balloons flying well above commercial air traffic. In this case, conversion to SR is desirable because such altitudes lie above about 90% of the Earth's atmosphere and are therefore subject to the same AE effects as orbiting EOS. Additionally, the same procedures for image conversion described herein are also appropriate for imagery acquired by aircraft at all altitudes and especially to clear dust, thin clouds, and smoke from military drone imaging, even at low altitudes. These applications are incorporated herein.

Although this process has been described in detail with reference to these preferred embodiments, other embodiments can achieve the same results for the process of converting TOAR to SR. The conversion can be practiced employing generally conventional materials and equipment. Accordingly, the details of such materials and equipment are not set forth in detail herein. In this description, specific details are set forth, such as specific mathematical relationships, data preparation, procedures, etc. to provide a thorough understanding of the conversion. However, as one having ordinary skill in the art will recognize, the conversion can be practiced without resorting strictly to the details specifically set forth. For example, replacing closed form mathematics for generation of MinB with methods developed through spatially-based artificial intelligence while retaining other steps intact. In other instances, well known processing structures have not been described in detail, in order not to unnecessarily obscure description of the conversion. Many other modifications and alternatives are possible.

Figure 17:
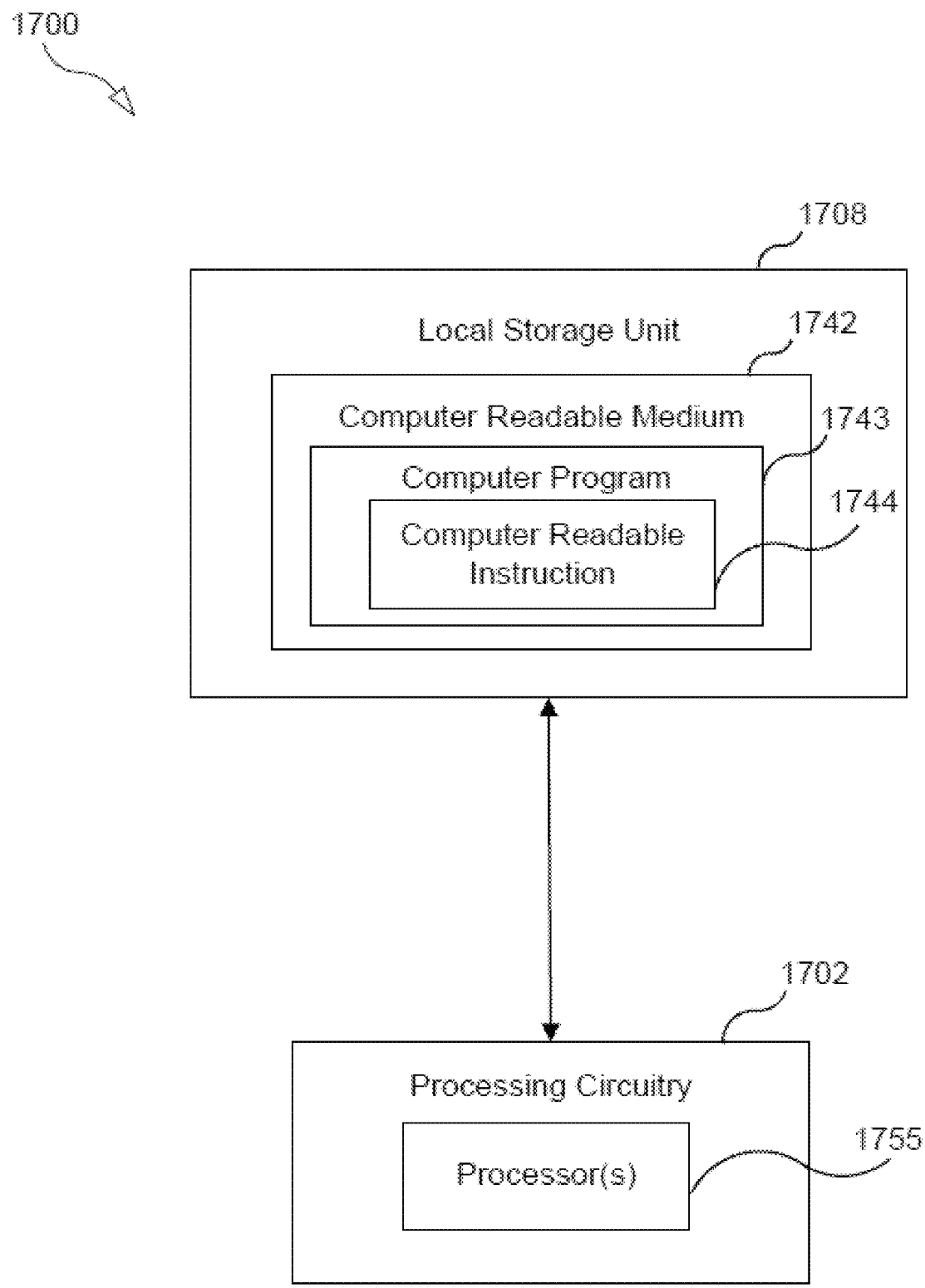
FIG. 17 shows an exemplary system configured to perform the methods described herein.

FIG. 17 shows an exemplary system 1700 capable of performing the methods described above. As shown in FIG. 17, system 1700 may comprise: processing circuitry (PC) 1702, which may include one or more processors (P) 1755 (e.g., one or more general purpose microprocessors and/or one or more other processors, such as an application specific integrated circuit (ASIC), field-programmable gate arrays (FPGAs), and the like); and a local storage unit (a.k.a., "data storage system") 1708, which may include one or more non-volatile storage devices and/or one or more volatile storage devices. System 1700 may further comprise a computer readable medium 1742 storing a computer program (CP) 1743 comprising computer readable instructions (CRI) 1744. CRM 1742 may be a non-transitory computer readable medium, such as, magnetic media (e.g., a hard disk), optical media, memory devices (e.g., random access memory, flash memory), and the like. In some embodiments, the CRI 1744 of computer program 1743 may be configured such that when executed by PC 1702, the CRI causes system 1700 to perform any of the methods and processes described herein (e.g., steps described herein with reference to the flow charts). System 1700 may also embody the computer systems described herein (e.g., with regard to the system diagrams). In some embodiments, system 1700 may be deployed on an EOS or aerial vehicle so that images may be converted at or near the observation device, and post-conversion images may be transmitted to base stations in communication with the observation device. In other embodiments, system 1700 may be deployed at the base stations, at cloud processing centers, or at local user systems for users who wish to convert images for improved image analysis.

Only some embodiments of the conversion and but a few examples of its versatility are described in the present disclosure. It is understood that the process is capable of use in various other combinations and is capable of changes or modifications within the scope of the inventive concept as expressed herein. Modification of these procedures will be well understood by those skilled in the art and it is intended to cover in the appended claims all such modifications and equivalents. The disclosures of all patents identified hereinabove are incorporated by reference.

The invention claimed is:

1. A method for generating a statistical model for spatial representation of a multitude of atmospheric effect magnitudes distributed across a digitally recorded observation device image of the Earth's surface taken from above, to be used for scaling the removal of the atmospheric effect from a new device image, the method comprising:
  selecting a vegetation type that grows in continuous healthy canopies;
  identifying a surface reflectance vegetation reference value in a blue spectrum that is a stable property of the vegetation type to serve as a reference against which a magnitude of an atmospheric effect can be estimated, the atmospheric effect degrading image data according to its magnitude relative to what would be recorded at Earth's surface having no atmospheric effect;
  identifying the vegetation type growing in the continuous healthy canopies on a plurality of observation device images that express a range of atmospheric effect magnitudes;
  for each of the plurality of observation device images:
    selecting one or more plots of the vegetation type, each such plot expressing healthy, homogeneous and continuous vegetation cover;
    extracting a top-of-atmosphere reflectance value in a blue band for the one or more plots:
    selecting one or more discrete areas, each of the one or more discrete areas being within a 20 kilometer distance from a selected-vegetation plot;
    determining, for each discrete area of the one or more discrete areas, top-of-atmosphere reflectance statistics for two or more spectral bands;
    pairing the top-of-atmosphere reflectance statistics for the two or more spectral bands with the top-of-atmosphere reflectance value in the blue band, thereby forming one or more sample pairs, each consisting of the top-of-atmosphere reflectance value in the blue band and, for a discrete area located within the 20 kilometer distance, the top-of-atmosphere reflectance statistics for the two or more spectral bands;
  combining paired sample pairs plots and their one or more discrete areas obtained from the plurality of observation device images into a pooled sample; and
  from the pooled sample, generating a statistical model to predict a new top-of-atmosphere blue spectral band vegetation reference value from new spectral band statistics sampled from new discrete areas on new device images that represents the magnitude of the atmospheric effect, wherein an atmospheric effect magnitude forming a grayscale across the new device image area pursuant to additional steps for removal of the atmospheric effect from the device image.

2. The method of claim 1, wherein the observation device is an Earth observation satellite or aerial vehicle.

3. The method of claim 1, wherein the plurality of statistics include the two or more spectral bands is sampled from spatially discrete areas.

4. The method of claim 1, wherein the use of the image-sampled statistics from plots or spatially discrete areas applied for modeling can include statistics from plots and spatially discrete areas measured by field spectrometry.

5. The method of claim 1, wherein the statistical model is generated using at least one of multiple regression or machine learning.

6. The method of claim 1, wherein a multitude of gridcells is used to spatially define a multitude of discrete areas across a new observation device image.

7. The method of claim 1, wherein the model is applied to predict the top-of-atmosphere blue band reference value for each of the multitude of gridcells across the new observation device image from the statistics for the two or more spectral bands.

8. The method of claim 1, wherein the top-of-atmosphere blue band reference value represents an index for the magnitude of the atmospheric effect.

9. The method of claim 1, wherein the index, sampled by continuous gridcells across a new image expresses a grayscale raster for the magnitude of the spatially discrete atmospheric effect for the purpose of scaling the removal of the atmospheric effect from the device image.

10. A system for generating a statistical model to map a spatial representation of atmospheric effect magnitude across an observation device image pursuant to removal of the atmospheric effect, thereby delivering estimates of surface reflectance, the system comprising:
  a computer processor, and
  a computer-readable medium storing instructions that, when executed by the processor, are configured to cause the system to perform operations, wherein the operations include:
    selecting a vegetation type that grows in continuous healthy canopies;
    obtaining spectrometer measurements to identify a blue band surface reflectance vegetation value that is a stable reflectance property of the vegetation type to serve as a reference against which the atmospheric effect can be estimated, the atmospheric effect resulting in degradation of image data relative to what would be recorded at Earth's surface;
    identifying the vegetation type growing in continuous healthy canopies on a plurality of observation device images that expresses a range of atmospheric conditions;
    for each of the plurality of observation device images:
      selecting one or more plots of the vegetation type, each such plot expressing continuous, healthy cover of the vegetation type;
      measuring a top-of-atmosphere blue spectral band vegetation reflectance value for each selected-vegetation plot;
      selecting one or more discrete areas, each of the one or more discrete areas within a 20 kilometer distance of a selected-vegetation plot;

obtaining a top-of-atmosphere reflectance for two or more spectral bands of an observation device from the one or more discrete areas;

determining, for each discrete area of the one or more discrete areas, a plurality of statistics based on the top-of-atmosphere reflectance of the two or more spectral bands;

pairing the plurality of statistics for the one or more discrete areas with the top-of-atmosphere blue spectral band reflectance value of a nearest vegetation plot, thereby forming sample pairs;

combining sample pairs from the plurality of observation device images into a pooled sample;

from the pooled sample, generating a statistical model that predicts new top-of-atmosphere vegetation reference values as an index predicted by the model from spectral band statistics sampled from new discrete areas for the purpose of removing the atmospheric effect from the device image.

11. The system of claim 10, wherein the plurality of statistics generated for the two or more spectral bands from spatially discrete areas include at least two of the one or more spectral bands of the observation device.

12. The system of claim 10, wherein the sampled statistics for plots and discrete areas may be generated by field spectrometer.

13. The system of claim 10, wherein the statistical model is generated using at least one of multiple regression or machine learning.

14. The system of claim 10, wherein gridcells are used to spatially define discrete areas for extraction of the statistics on new device images.

15. The system of claim 10, wherein the new top-of-atmosphere vegetation reference values are an index that when expressed as a raster sampled by gridcells for the new discrete areas across the device image portrays a grayscale map for the magnitude of the atmospheric effect.

16. The system of claim 10, wherein a grayscale map is applied as a scalar to guide removal of the atmospheric effect to deliver an estimated surface reflectance discretely across the observation device image.

* * * * *